US012573751B2

(12) United States Patent
Liao et al.

(10) Patent No.: US 12,573,751 B2
(45) Date of Patent: Mar. 10, 2026

(54) FEED NETWORK, ANTENNA, ANTENNA SYSTEM, BASE STATION AND BEAM FORMING METHOD

(71) Applicant: HUAWEI TECHNOLOGIES CO., LTD., Shenzhen (CN)

(72) Inventors: Zhiqiang Liao, Shenzhen (CN); Weihong Xiao, Dongguan (CN); Libiao Wang, Dongguan (CN); Guoqing Xie, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 412 days.

(21) Appl. No.: 18/344,513

(22) Filed: Jun. 29, 2023

(65) Prior Publication Data

US 2023/0352833 A1 Nov. 2, 2023

Related U.S. Application Data

(63) Continuation of application No. PCT/CN2020/142428, filed on Dec. 31, 2020.

(51) Int. Cl.

*H01Q 3/36* (2006.01)
*H01Q 3/38* (2006.01)
*H01Q 1/24* (2006.01)
*H01Q 21/06* (2006.01)
*H01Q 21/24* (2006.01)

(52) U.S. Cl.

CPC ................. *H01Q 3/36* (2013.01); *H01Q 3/38* (2013.01); *H01Q 1/246* (2013.01); *H01Q 21/061* (2013.01); *H01Q 21/24* (2013.01)

(58) Field of Classification Search

CPC .......... H01Q 3/36; H01Q 3/38; H01Q 21/061; H01Q 21/24; H01Q 1/246

USPC .................................................. 342/367, 372

See application file for complete search history.

(56) References Cited

U.S. PATENT DOCUMENTS

| | | | | |
|---|---|---|---|---|
| 8,577,308 B2 * | 11/2013 | Choi | .................... | H04B 7/0617 455/101 |
| 8,736,493 B2 * | 5/2014 | Ai | ............................ | H01Q 3/26 342/373 |
| 10,333,220 B2 * | 6/2019 | Zhao | .................... | H01Q 21/296 |

(Continued)

FOREIGN PATENT DOCUMENTS

| | | | | |
|---|---|---|---|---|
| CN | 105552484 A | 5/2016 | | |
| EP | 3067988 A1 * | 9/2016 | ............. | H01Q 1/246 |

(Continued)

OTHER PUBLICATIONS

India Office Action issued in corresponding India Application No. 202337045349, dated Jul. 3, 2024, pp. 1-5.

*Primary Examiner* — Chuong P Nguyen

(74) *Attorney, Agent, or Firm* — HAUPTMAN HAM, LLP

(57) ABSTRACT

A feeding network, an antenna, an antenna system, a base station, and a beam forming method. The antenna includes an array antenna, a feeding network, and an antenna port. The array antenna includes a plurality of radiating elements. Each output of each feeding network is connected to at least one radiating element in the array antenna. Each input of each feeding network is connected to the antenna port. Each feeding network has one input and two outputs, and one of the two outputs includes a phase shifter. The phase shifter has a first operating state to increase the coverage space of beam forming.

20 Claims, 11 Drawing Sheets

(56) References Cited

U.S. PATENT DOCUMENTS

| | | | | |
|---|---|---|---|---|
| 10,700,418 | B2 * | 6/2020 | Johansson | H01Q 21/29 |
| 11,837,796 | B2 * | 12/2023 | Jia | H01P 1/18 |
| 11,923,619 | B2 * | 3/2024 | Horn | H04B 7/0421 |
| 12,113,297 | B2 * | 10/2024 | Qin | H04B 7/0617 |
| 2017/0062950 | A1 * | 3/2017 | Wang | H01Q 25/001 |

FOREIGN PATENT DOCUMENTS

| | | | | |
|---|---|---|---|---|
| EP | 3591857 | B1 * | 8/2023 | H04B 7/0408 |
| WO | 2012103855 | A2 | 8/2012 | |

* cited by examiner

FEED NETWORK, ANTENNA, ANTENNA SYSTEM, BASE STATION AND BEAM FORMING METHOD

CROSS-REFERENCE TO RELATED APPLICATIONS

This application is a continuation of International Application No. PCT/CN2020/142428, filed on Dec. 31, 2020, the disclosure of which is hereby incorporated by reference in its entirety.

BACKGROUND

A base station antenna is a connection device between a mobile user terminal and a wireless network radio frequency front-end, and is mainly used for wireless signal coverage in cells. The base station antenna generally includes an array antenna, a feeding network, and an antenna port. The array antenna includes several independent arrays formed by radiating elements with different frequencies, and radiating elements in each column transfer and receive or transmit radio frequency signals through their own feeding networks. The feeding network implements different radiation beam directions through a drive component, or is connected to a calibration network to obtain a calibration signal used by the system. A module for expanding performance, such as a combiner or a filter, also exists between the feeding network and the antenna port.

A base station antenna and a transceiver (TRX) connected to the base station antenna together form an antenna system of the base station. The following uses a radio remote unit (RRU) as an example of the TRX for description. A quantity of antenna ports of the base station antenna matches a quantity of RRU ports for installation. For example, in response to an eight-port RRU being matched, that is, an 8T8R RRU (representing an RRU with eight ports, each of which implements a 1T1R function), a quantity of antenna ports of the base station antenna is also to be eight.

In response to the array antenna of the base station antenna using a dual-polarized antenna unit, each column of dual-polarized antenna corresponds to two columns of antennas to implement diversity reception. Therefore, two antenna ports are used for each column of dual-polarized antenna. In a schematic diagram shown in FIG. 13, in response to an eight-port RRU, that is, an 8T8R RRU, being used, only a base station antenna of four columns of dual-polarized antennas (corresponding to eight antenna ports) is matched, but a base station antenna of eight columns of dual-polarized antennas (corresponding to 16 antenna ports) cannot be matched. The apertures of the four columns of dual-polarized antennas are relatively small. In response to beam forming (beam forming, BF) being performed on the four columns of antennas, a horizontal spacing of approximately 0.5 wavelengths is to be maintained between the columns to implement beam forming, resulting in a limited width of the array antenna, an insufficient gain, and a limited coverage capability. In response to a 16-port RRU, that is, 16T16R RRU, being used, eight columns of dual-polarized antennas is matched. A beam forming gain is high, but RRU costs are also high. Logically, the costs of the RRU are doubled compared with that of the eight-port RRU, resulting in low cost-effectiveness.

For a base station antenna, a single-sided antenna is used to increase a signal coverage area. That is, a base station antenna with more columns of dual-polarized antennas is used. In addition, considering the costs, a quantity of ports on the RRU should be as minimized as possible. Therefore, how to match a base station antenna having more columns of antennas, that is, more antenna ports, with a transceiver having fewer ports, to implement a relatively large signal coverage area at a relatively low cost is a technical problem to be resolved in at least one embodiment.

SUMMARY

In view of the foregoing problem in the conventional technology, embodiments described herein provide a feeding network, an antenna including the feeding network, an antenna system including the antenna, a base station, and a beam forming method, to implement matching of more columns of antennas and transceivers having fewer ports.

In order to achieve the foregoing objective, according to the first aspect of at least one embodiment, a feeding network is provided, where the feeding network has one input and two outputs, and one of the two outputs includes a phase shifter; and the phase shifter has a first operating state, where a first operating state means that in phase differences of two output signals, the phase differences of signals in at least two frequency bands are different.

As described above, the feeding network achieves that two columns of antennas correspond to one antenna port. Thus, a transceiver (TRX) with fewer ports, for example, a radio remote unit (RRU), is used to match an antenna array with more columns. That is, the matching of more columns of antennas and a transceiver with fewer ports mentioned in the background art, thereby solving the technical problem of how to implement a relatively large signal coverage area at a relatively low cost mentioned in the background art. In addition, in one slot, carrier phases in different frequency bands are different, so that beam forming corresponding to different frequency bands is distributed differently in space, and is complementary in space. This increases coverage space of the beam forming in one slot.

In addition, compared with the feeding network in a conventional technology 1, in response to corresponding to the same quantity of antenna columns, a quantity of phase shifters on the feeding network in at least one embodiment is reduced by half and both costs and insertion loss are reduced. Compared with a conventional technology 2, the improvement lies in that a phase shifter is added, and the phase shifter is used to enable two corresponding outputs to have a phase difference, which is more conducive to beam forming.

In a possible implementation of the first aspect, that phase differences of signals in at least two frequency bands are different includes: The phase differences of the signals in each frequency band vary with a frequency of each frequency band.

According to the foregoing, phases vary with a frequency of frequency bands, which implements that phases of signals (for example, different subcarriers corresponding to different frequency bands) in different frequency bands are different, so that beam forming corresponding to different frequency bands is distributed differently in space, and is complementary in space. This increases coverage space of the beam forming.

In a possible implementation of the first aspect, a change rate of the phase difference varying with a frequency of each frequency band is not less than 0.5.

The value of the change rate should be such that the signal phase of the frequency band is apparently different from the signal phase of the original frequency band in response to the antenna radiating another frequency band. In this way, beam forming of signals (for example, different subcarriers corresponding to different frequency bands) in different frequency bands is relatively obvious in space to be complementary, and the value of 0.5 meets this usage. In specific implementations of at least one embodiment, the change rate is a slope of a diagonal line, or a slope of a plurality of broken lines that are slanted as a whole.

In a possible implementation of the first aspect, the phase shifter further has a second operating state, and a second operating state enables the two outputs to have a specified phase difference.

In the operating state of the phase shifter, in response to different slots being switched, is implemented that beam forming in different directions is formed in different slots. Beam forming in different slots is distributed differently in space, and is complementary in space. This increases coverage space of the beam forming. In this operating state, phases of signals (for example, different subcarriers corresponding to different frequency bands) in one slot are the same.

In a possible implementation of the first aspect, the specified phase difference that the phase shifter enables the two outputs to have includes: 0 degrees, 90 degrees, or 180 degrees.

The values mentioned above are specific optional values of the phase difference that the phase shifter enables the two outputs to have.

In a possible implementation of the first aspect, the phase difference of the signals in at least one of the frequency bands remains unchanged.

As described above, as for all or part of frequency bands, the phase difference of two output signals in a single frequency band is unchanged. Thus, the phase difference of two output signals in each frequency band varies with the frequency of each frequency band on the whole. But in a single frequency band of one or more of the two output signals, the phase difference of the two output signals remain unchanged.

According to the second aspect of at least one embodiment, an antenna is provided, including an array antenna, an antenna port, and any one of the foregoing feeding networks.

The array antenna includes a plurality of radiating elements.

Each output of each feeding network is connected to at least one radiating element in the array antenna.

Each input of each feeding network is connected to the antenna port.

By using the feeding network, a quantity of antenna array columns of antennas in at least one embodiment is greater than a quantity of antenna ports, so that a TRX, such as an RRU, corresponding to the quantity of antenna ports is matched. That is, the antenna having more columns of antenna arrays match the RRU having fewer ports. Thus, the technical problem of how to implement a large signal coverage area at a relatively low cost mentioned in the background art is solved. In addition, compared with the feeding network in the conventional technology 1, in response to corresponding to the same quantity of antenna columns, a quantity of phase shifters on the feeding network in at least one embodiment is reduced by half, costs are reduced, and an insertion loss is also reduced. Compared with the conventional technology 2, the improvement lies in that a phase shifter is added, and the phase shifter is used to enable two corresponding outputs to have a phase difference, which is more conducive to beam forming. In addition, the antenna has the advantages described in the foregoing feeding network, and details are not described herein again.

In a possible implementation of the second aspect, the plurality of radiating elements of the array antenna form at least M columns of radiating elements.

M outputs of N of the feeding networks are respectively connected to the M columns of radiating elements, where M=2N, and N>1.

In a possible implementation of the second aspect, two outputs of an $n^{th}$ feeding network are respectively connected to an nth radiating elements and the $(n+M/2)^{th}$ radiating elements in the M columns of radiating elements, and one output connected to the $(n+M/2)^{th}$ column of radiating elements includes the phase shifter, where $n \in N$, and $n \leq N/2$.

As described above, each feeding network is connected to each column of radiating elements of the antenna array by using the foregoing rule, and one output equivalent circuit that is of each feeding network and has a phase shifter is the same. Therefore, each feeding network uses a same control method to control each beam forming, which facilitates beam forming control.

According to the third aspect of at least one embodiment, an antenna system, including a transceiver and any one of the foregoing antennas, is provided, where each port of the transceiver is correspondingly connected to each of the antenna ports.

In a possible implementation of the third aspect, the transceiver includes a radio remote unit.

As described above, the antenna system has the advantages of the foregoing antenna, and details are not described herein again.

According to the fourth aspect of at least one embodiment, a base station is provided, the base station including: a pole, the antenna according to any one of the foregoing, or the antenna system according to any one of the foregoing, where the antenna is fixed on the pole.

As described above, the base station has the advantages of the foregoing antenna or antenna system, and details are not described herein again.

According to the fifth aspect of at least one embodiment, a beam forming method based on the antenna according to the second aspect is provided. The method includes:

- enabling the radiating element connected to two outputs of a feeding network to radiate signals of at least two frequency bands; and
- enabling phase differences of signals in at least two frequency bands of the two radiations to be different through the phase shifter included in one of the outputs.

As described above, the beam forming method enables the phase difference of two output signals to be in a change state through a phase shifter, where the phase difference varies with the frequency of frequency bands. Therefore, in response to the antenna radiating subcarriers in different frequency bands, different beam forming corresponding to subcarriers in different frequency bands is distributed differently in space due to the change of the phase difference, and spatial complementarity is formed. This increases coverage space of beam forming.

Further, after the beneficial effects of at least one embodiment are summarized, the following is further included:

- an antenna-side gain: Compared with the background art, the antenna in at least one embodiment doubles a quantity of antenna columns without increasing RRU ports; that is, logically, a gain of an antenna bandwidth is increased by 3 dB; and
- a system-side gain: in a time division duplex (TDD) system, only one state beam is transmitted at a time due to limited slot allocation in uplink. In response to users are evenly distributed, full-user connection cannot be realized only by the way of combining two state beams into one state beam. Further, the phase difference of subcarriers in each frequency band in the two outputs is in a change state, which realizes the change of a formed beam direction, to increase spatial coverage of beam forming to implement access of more users. That is, in response to the users being unevenly distributed in space, any one of the following two methods is used: phase differences of the two outputs are fixed values of 0, 90 and 180, or the phase differences are in a change state. In response to the users being evenly distributed in space, uplink access of more users is implemented by using a beam corresponding to a phase difference of subcarriers of each frequency band in the two outputs, where the phase difference is in a change state.

These aspects and other aspects of at least one embodiment are more concise and understandable in the description of the following embodiments.

BRIEF DESCRIPTION OF DRAWINGS

The following further describes the features of at least one embodiment and the relationship between the features with reference to the drawings. The drawings are all examples, and some features are not shown in actual proportions. In addition, in some drawings, common features that are not mandatory are omitted. Alternatively, additional features that are not mandatory for embodiments described herein are shown. A combination of the features shown in the drawings is not intended to limit embodiments described herein. In addition, in embodiments described herein, content referred to by same reference signs is also the same. The specific drawings are described as follows.

DESCRIPTION OF EMBODIMENTS

Figure 1:
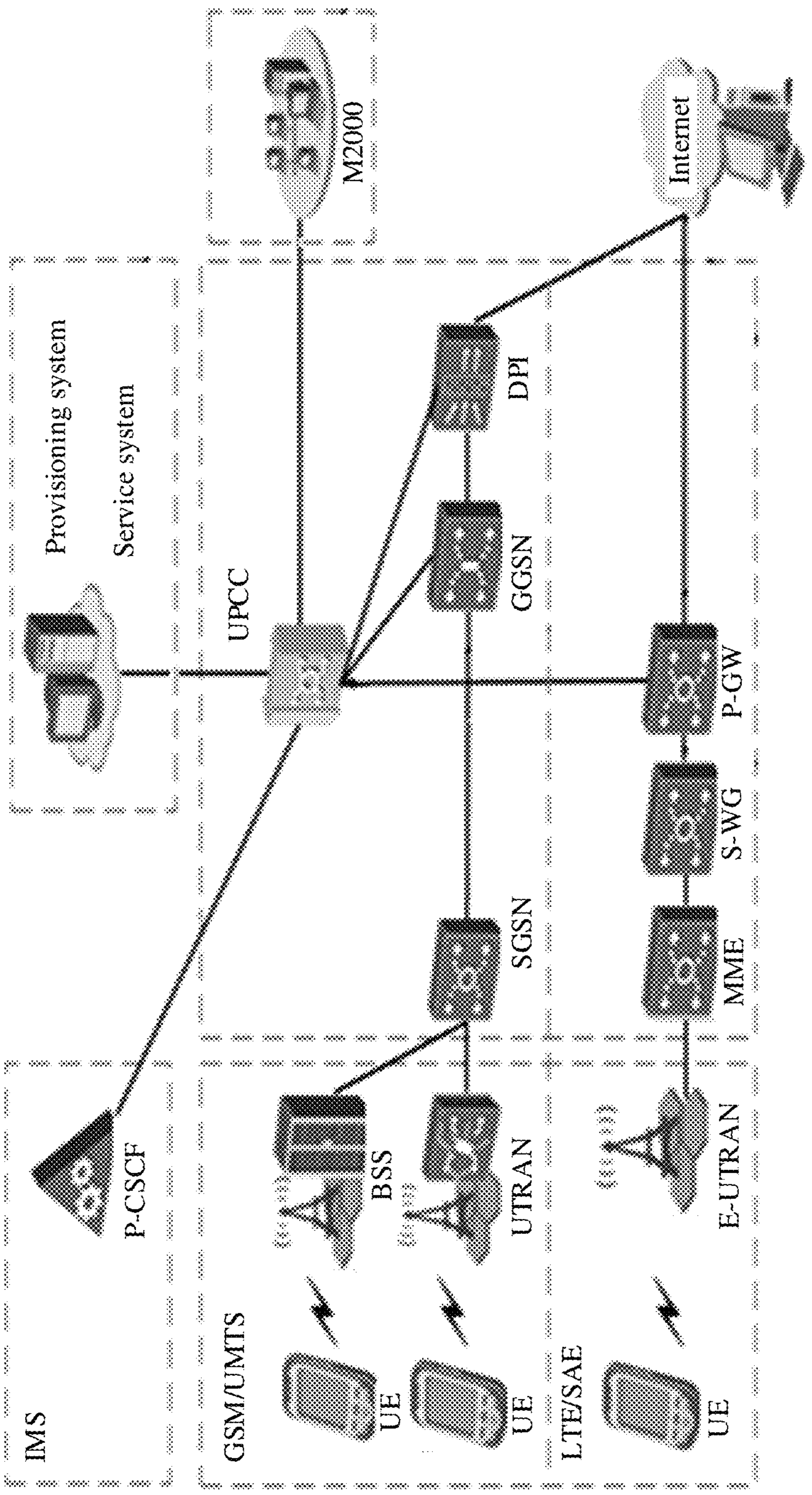
FIG. 1 is a schematic diagram of a first embodiment of a mobile communication system according to at least one embodiment.

The words "first, second, third, or the like" or similar terms such as module A, module B, and module C in embodiments described herein and claims are only used to distinguish between similar objects, and do not represent a specific order for objects. A specific order or sequence is exchanged in response to being allowed, so that embodiments described herein is implemented in an order other than that illustrated or described herein.

In the following descriptions, involved reference numerals such as S110 and S120 that indicate steps do not necessarily indicate that the steps are to be performed based on the order, and consecutive steps is transposed in response to being allowed, or is performed simultaneously.

The term "include" as used in the embodiments described herein and claims should not be construed as being limited to the content listed below; and the term does not exclude other elements or steps. Accordingly, the presence of the feature, whole, step or component mentioned is interpreted as being specified, but does not preclude the presence or addition of one or more other features, wholes, steps or components and groups thereof. Therefore, the expression "device including apparatuses A and B" should not be limited to device consisting of only components A and B.

"One embodiment" or "an embodiment" mentioned as described means that a specific feature, structure, or characteristic described in combination with this embodiment is included in at least one embodiment. Therefore, the term "in one embodiment" or "in an embodiment" appearing throughout does not necessarily refer to a same embodiment, but refers to a same embodiment. Further, in one or more embodiments, the particular features, structures, or characteristics is combined in any suitable manner, as will be apparent to those of ordinary skill in the art from the present disclosure.

Unless otherwise defined, all technical and scientific terms used herein have same meanings as those usually understood by a person skilled in the art. In case of any inconsistency, the meaning described in at least one embodiment or the meaning obtained based on the content described herein shall be used. In addition, the terms used herein are merely for the purpose of describing embodiments herein, but are not intended to limit embodiments described herein.

To accurately describe the technical content in at least one embodiment and to accurately understand embodiments described herein, before specific implementations are described, terms used herein are first explained or defined as follows:

1. Array antenna: The array antenna is an antenna system composed of several identical radiating elements arranged according to a specific geometric rule to operate through a feeding network.
2. Radio remote unit (Radio Remote Unit, RRU): The radio remote unit is an apparatus that converts baseband optical signals into radio frequency signals at a remote end and amplifies the radio frequency signals.
3. Baseband unit (Baseband Unit, BBU): The frequency band (frequency bandwidth) inherent to the original electrical signals that are not modulated (performing spectrum shift and conversion) sent by the source is called as a basic frequency band, or baseband for short; and the BBU is a general term for a component module that processes baseband signals.
4. Power divider (Power divider): The power divider is also referred to as a power splitter, and is a device that divides energy of one input signal into two or more channels and outputs equal or unequal energy; or also combines energy of a plurality of channels of signals into one channel for output, and in this case, the power divider also is referred to as a combiner.
5. Combiner: The combiner is a device that combines energy of a plurality of channels of signals into one channel for output; and as mentioned above, the power divider is used as a combiner in reverse.
6. Phase shifter: The phase shifter enables a phase from an input signal of the component to an output port signal of the component to change in a specific manner, to implement the change in a beam forming diagram (that is, an antenna directivity diagram). The phase shifter in at least one embodiment is a digital phase shifter. In response to the phase shifter being a 2-bit digital phase shifter, four phase states are supported. In at least one embodiment, the four phase states are 0-degree, 90-degree, 180-degree, and X-degree phase states. In at least one embodiment, a state in which the phase shifter is in the X-degree phase state is referred to as a first operating state of the phase shifter; and a state in which the phase shifter is in a non-X-degree phase state (for example, in the 0-degree state, 90-degree state, or 180-degree state) is referred to as a second operating state. Details will be described later.
7. Feeding network: The feeding network is configured to perform beam forming for transmitted signals, including changing a beam width, a shape, and a beam direction of a beam. The feeding network includes a vertical-dimensional feeding network and a horizontal-dimensional feeding network.

Figure 8A:
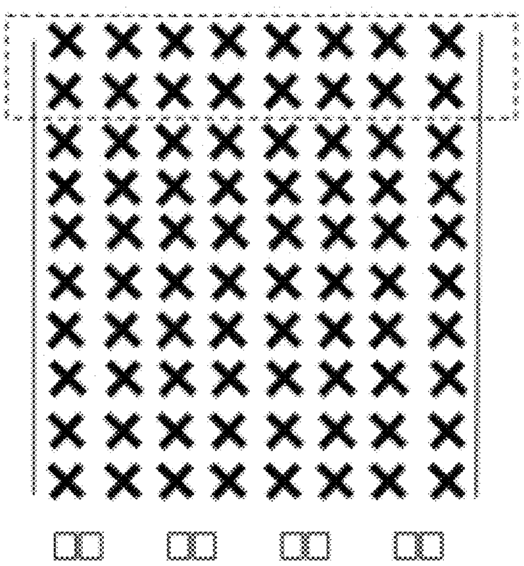
FIG. 8A is a schematic diagram of an antenna array according to at least one embodiment.
Figure 9A:
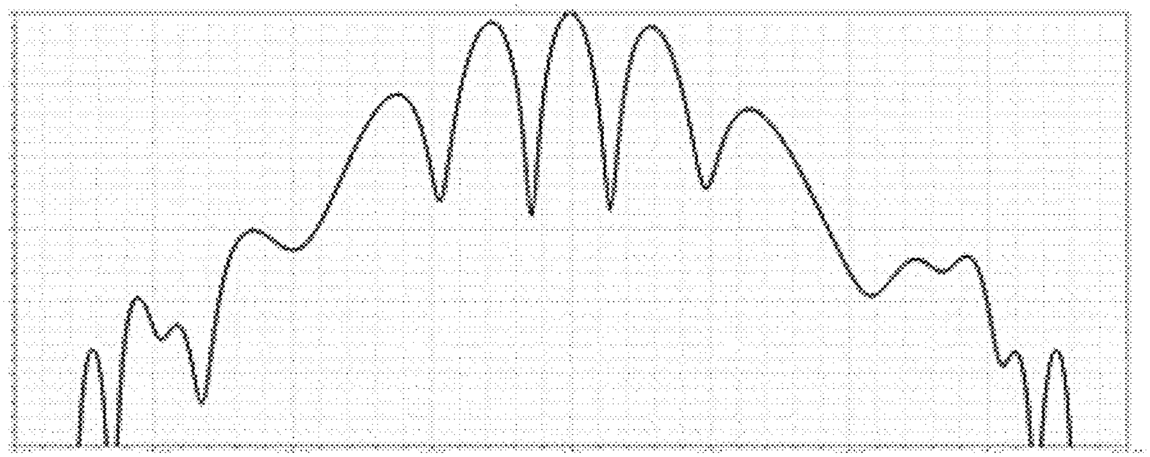
FIG. 9A is a beam forming diagram in a horizontal plane direction in response to a phase shifter enabling two outputs of a feeding network to be 0-degree phase difference according to at least one embodiment.

Each column of the array antenna corresponds to a plurality of vertical-dimensional feeding networks feeding each radiating element group arranged vertically in the column, and is used to form a horizontal beam forming diagram (the beam forming diagram shown in FIG. 9A is a beam forming diagram formed by five groups of radiating elements in a first column and five groups of radiating elements in a fifth column of the antenna array shown in FIG. 8A in response to a phase difference corresponding to the two columns being 0).

Each output of the horizontal-dimensional feeding network is connected to each column of antennas, and each input is connected to each port of an antenna port. The horizontal-dimensional feeding network involves a quantity of antenna ports. Therefore, unless otherwise specified, the feeding network in at least one embodiment refers to a horizontal-dimensional feeding network.

8. BUTLER network: a feeding network.
9. Operating frequency band: an operating frequency region. In at least one embodiment, an operating frequency band is divided into different frequency bands, and each frequency band corresponds to one subcarrier. For example, a 100M operating frequency band is divided into five frequency bands in units of 20M, and each frequency band respectively corresponds to five subcarriers.

The following first analyzes the conventional technology.

Figure 11:
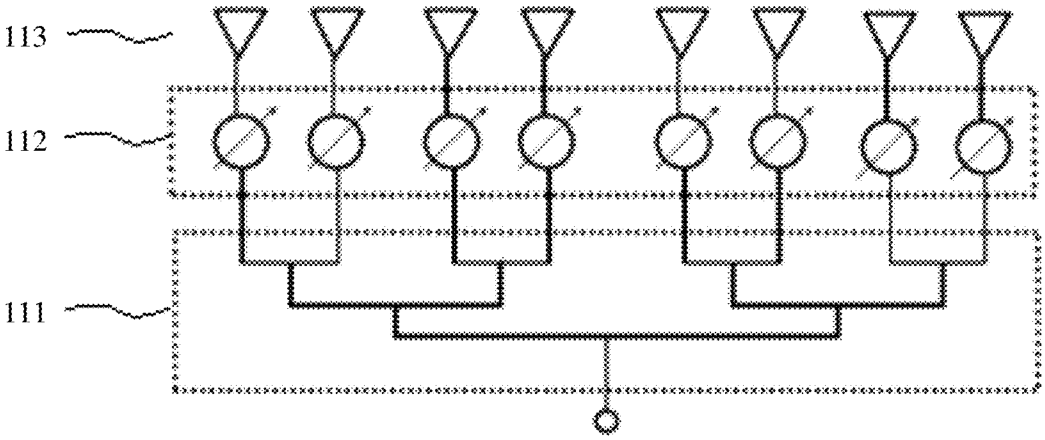
FIG. 11 is a schematic diagram of an antenna with a phase shifter according to a conventional technology 1.

Conventional technology 1: FIG. 11 shows an antenna having a phase shifter. In the antenna structure, each input in a feeding network 111 of the antenna is converted into two outputs, and each output is connected to an antenna array 113 through a phase shifter 112. The conventional technology has the following problems: each output is provided with the phase shifter 112, so that the whole system is relatively complex; and a relatively large quantity of phase shifters 112 result in a high overall loss. In addition, in this technology, after one input is converted into two outputs and is output by the phase shifter, a phase difference between the two outputs is a phase difference that does not varies with the frequency. That is, in response to a frequency band of a signal of an antenna connected to the two outputs changing, the phase difference of subcarriers of the two outputs in each frequency band does not change accordingly.

Figure 12:
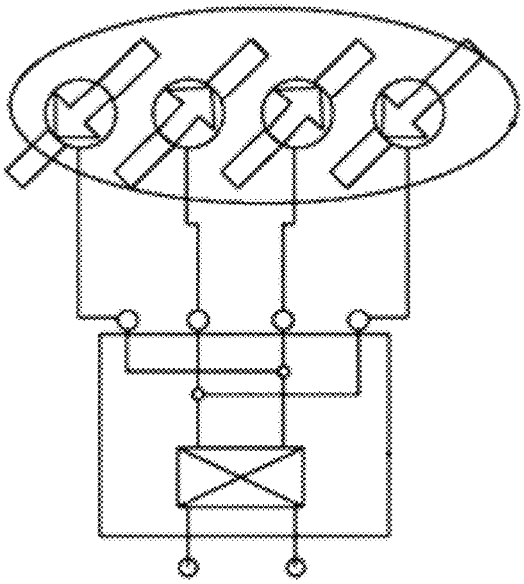
FIG. 12 is a schematic diagram of a connection between a BUTLER network and an antenna in a conventional technology 2.
Figure 13:
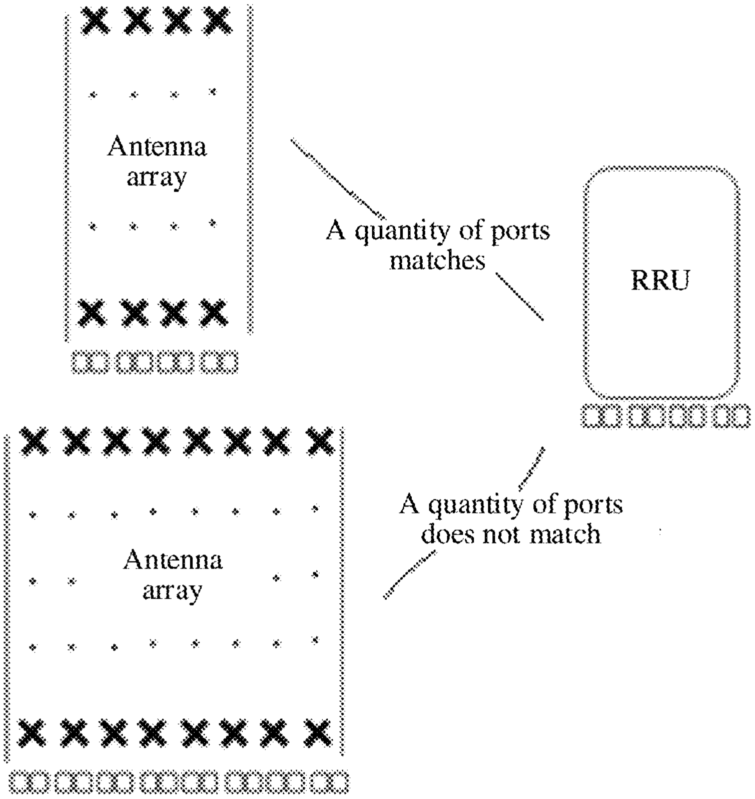
FIG. 13 is a schematic diagram of whether an antenna port matches an RRU port in the background art.

Conventional technology 2: A BUTLER network is provided in the Patent Application with International Publication No. WO103855A2 entitled ANTENNA AND BASE STATION. In a structure of the BUTLER network shown in FIG. 12, there are two input ports, and four output ports used to be connected to an array antenna. A first port and a third port of the output port of the BUTLER network are connected, and a second port and a fourth port are connected. The BUTLER network implements the connection between two input ports and four output ports. In this structure, each input port is to send a signal to two one-channel-to-two-channel subnetworks, and no phase shifter is provided on each one-channel-to-two-channel subnetwork. Therefore, in this technology, no phase difference varying with the frequency exists in the two corresponding outputs after one channel-to-two channel operation is performed. That is, in response to the frequency bands of carriers of the antenna connected to the two outputs changing, the phase difference of each subcarrier of the two outputs in each frequency band does not change accordingly.

Based on the conventional technology, an improved antenna solution is proposed in embodiments described herein. Two columns of an array antenna are connected to one input-to-two output feeding network, so that a quantity of antenna ports is reduced by half. In addition, a phase shifter is provided on one of the two outputs of the feeding network, and is used to adjust the phase difference of the two outputs, where the phase difference includes at least two states. In one of the states, the phase difference of the signals in each frequency band of the two outputs varies with a frequency of each frequency band that corresponds to the two outputs, so that the phases of the signals also change in response to the frequency bands of the two columns of antenna signals corresponding to the two outputs changing. Then, beams of different directions are generated to perform spatial coverage. This increases coverage space of a cellular sector.

The following describes embodiments in detail with reference to the drawings. First, an application scenario of the antenna provided in embodiments described herein, and then, a feeding network and a specific structure of an antenna including the feeding network are described in embodiments of the present invention.

The antenna provided in at least one embodiment is applicable to a mobile communication system. The mobile communication system herein includes but is not limited to: a global system for mobile communications (Global System for Mobile communications, GSM), a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, LTE time division duplex (Time Division Duplex, TDD), a universal mobile telecommunication system (Universal Mobile Telecommunication System, UMTS), a worldwide interoperability for microwave access (Worldwide Interoperability for Microwave Access, WiMAX) communication system, a future fifth generation (5th Generation, 5G) system, or new radio (New Radio, NR), or the like.

For example, the antenna provided in at least one embodiment is applied to a wireless network system shown in FIG. 1. The antenna is applied to a base station subsystem (Base Station Subsystem, BBS), a terrestrial radio access network (UMTS terrestrial radio access network, UTRAN), a universal mobile telecommunication system (UMTS) or an evolved universal terrestrial radio access network (Evolved Universal Terrestrial Radio Access, E-UTRAN), used for wireless signal coverage in cells, to implement connection between user equipment (User Equipment, UE) and a radio frequency end of the wireless network.

The antenna mentioned in embodiments is located in a radio access network device, to implement signal transmitting and receiving. Specifically, the radio access network device includes but is not limited to a base station shown in FIG. 2. The base station is a base transceiver station (Base Transceiver Station, BTS) in a GSM or CDMA system, or is a NodeB (NodeB, NB) in the WCDMA system, also is an evolved NodeB (Evolved NodeB, eNB, or eNodeB) in the LTE system, or is a radio controller in a cloud radio access network (Cloud Radio Access Network, CRAN) scenario. Alternatively, the base station is a relay station, an access point, an in-vehicle device, a wearable device, a base station in a future 5G network, a base station in a future evolved PLMN network, or the like, for example, a new radio base station. This is not limited in at least one embodiment. The base station provides radio cell signal coverage, and serve one or more cells as a terminal device.

Figure 2:
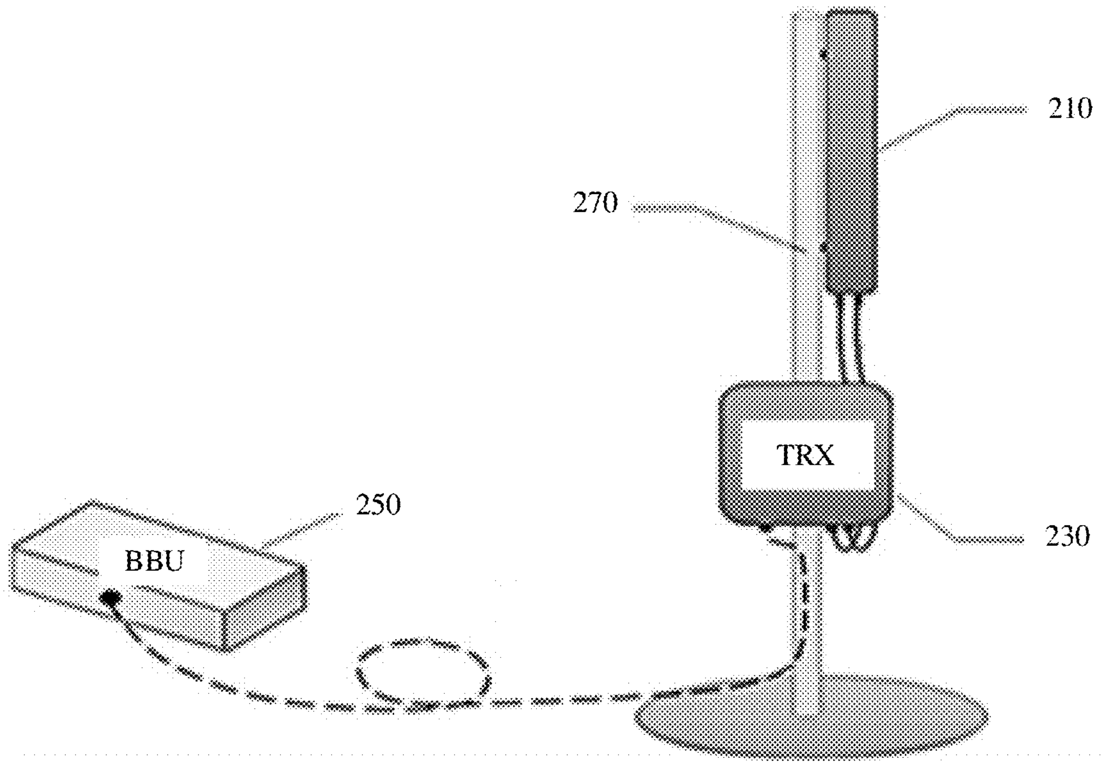
FIG. 2 is a schematic diagram of a first embodiment of a base station according to at least one embodiment.

As shown in FIG. 2, a possible structure of the base station includes an antenna 210, a transceiver (TRX) 230, and a baseband unit (BBU) 250. The antenna 210 and the transceiver 230 is mounted on a pole 270. The transceiver 230 is connected to an antenna port of the antenna 210, so that the antenna port is configured to receive a to-be-sent signal sent by the transceiver 230, and a radiating element of the antenna 210 radiates the to-be-sent signal, or send, to the transceiver 230, a received signal received by the radiating element. In the embodiment of FIG. 2, the TRX is a radio remote unit (RRU).

The BBU is configured to process a to-be-sent baseband optical signal and transmit the baseband optical signal to the RRU, or receive a received baseband signal (that is, the baseband signal, which is converted and processed by the RRU, obtained from a received radio frequency signal received by the antenna in a signal receiving process) transmitted by the RRU, and process the received baseband signal; and the RRU converts the to-be-transmitted baseband optical signal sent by the BBU into a to-be-sent radio frequency signal (including signal processing for baseband signals, such as signal amplification). Then, the RRU sends the to-be-sent radio frequency signal to the antenna through the antenna port, so that the radio frequency signal performs radiation through the antenna; or the RRU receives a received radio frequency signal transmitted by the antenna by using the antenna port, convert the received radio frequency signal into a received baseband signal, and send the received baseband signal to the BBU.

The antenna includes an array antenna, a feeding network, and an antenna port. The array antenna includes several radiating elements arranged in rows and columns, and is configured to receive and/or radiate radio waves. There is at least one feeding network. An output end of each feeding network is configured to feed each column of radiating elements in the array antenna. A phase shifter is provided on one output of the feeding network, and is configured to change a radiation direction of an array antenna radiation beam, to implement beam forming for transmitted signals. An input end of each feeding network is connected to an antenna port to form a transmit/receive channel, where each antenna port corresponds to one transmit/receive channel, and the antenna port is connected to a corresponding port of the TRX.

The radiating element of the array antenna is a single dipole element, a dual-polarized dipole element, a patch radiating element, a ring radiating element, or the like.

The feeding network provided in at least one embodiment has one input and two outputs, and one of the two outputs includes a phase shifter; and the phase shifter has a first operating state, where a first operating means that in phase differences of two output signals, the phase difference of signals in at least two frequency bands is different. The phase shifter further has a second operating state, and a second operating state enables the two outputs to have a specified phase difference.

The feeding network achieves that two columns of antennas correspond to one antenna port. Thus, a transceiver (TRX) with fewer ports, for example, a radio remote unit (RRU), is used to match an antenna array with more columns That is, the matching of more columns of antennas and a transceiver with fewer ports mentioned in the background art, thereby solving the technical problem of how to implement a relatively large signal coverage area at a relatively low cost mentioned in the background art. In response to the phase shifter being in a second operating state, spatial distribution of beam forming in different slots is implemented. In response to the phase shifter being in a first operating state, in one slot, different carrier phases in different frequency bands enable beam forming corresponding to different frequency bands to be distributed differently in space, and spatial complementarity is formed. This increases coverage space of beam forming in one slot, and further increasing the coverage space of beam forming in a plurality of slots.

In some embodiments, in the phase difference of the two output signals, that the phase difference of signals in at least two frequency bands is different includes: The phase difference of the signals in each frequency band varies with the frequency of each frequency band, and phase difference modes are various within part or all of a single frequency band. For example, several cases shown in FIG. 6A to FIG. 6D. Details will be described later.

The following further describes the structure of the antenna in at least one embodiment in detail. In a process of describing the antenna, the structure of the feeding network in at least one embodiment is further described in detail at the same time.

The antenna provided in this embodiment includes an array antenna, a feeding network, and an antenna port.

Figure 3A:
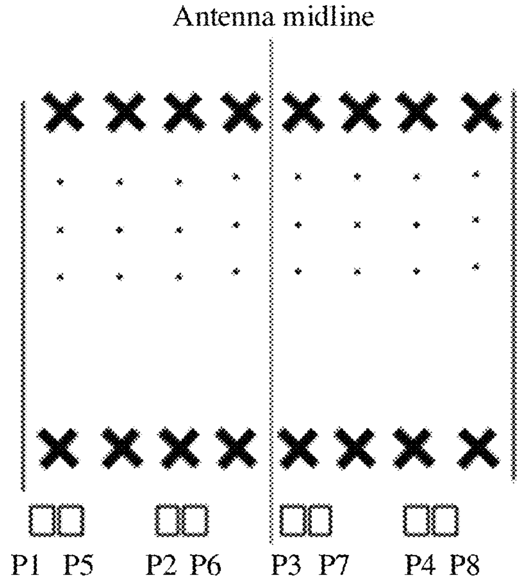
FIG. 3A is a schematic diagram of arrangement of array antennas and antenna ports according to at least one embodiment.

As shown in FIG. 3A, the array antenna includes several radiating elements forming an array, and each column has a plurality of radiating elements.

Figure 3B:
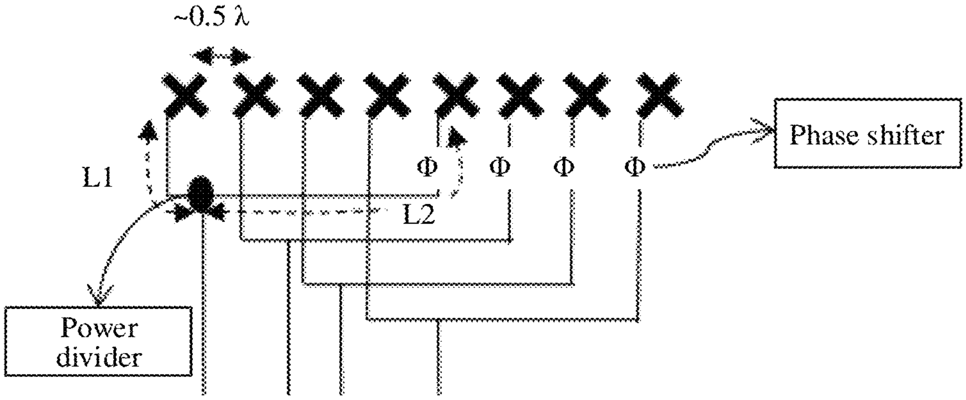
FIG. 3B is a schematic diagram of a connection between a feeding network and an array antenna according to at least one embodiment.

In the embodiment shown in FIG. 3B, at least one feeding network is included. Each feeding network has one input and two outputs. The feeding network further includes a power divider that is connected the one input to the two outputs.

Each input of each feeding network is connected to each antenna port of the antenna to form a transmit/receive channel, and the antenna port is connected to a corresponding port of the TRX. Each output of each feeding network is connected to each column of radiating elements, as described in detail below:

Each output of each feeding network is connected to at least one radiating element in the array antenna.

In some embodiments, the plurality of radiating elements of the array antenna include a plurality of columns of radiating elements, and a quantity of columns thereof is greater than or equal to M, where M is a natural number. In this embodiment, the quantity of columns is M.

M outputs of N of the feeding networks are respectively connected to M columns of radiating elements, and feed power to the M columns of radiating elements, where M=2N, and N>2.

In addition, two outputs of an $n^{th}$ feeding network are respectively connected to radiating elements in an $n^{th}$ column and radiating elements in an $(n+M/2)^{th}$ column. Alternatively, refer to FIG. 3A. The M columns of radiating elements are symmetrical to the midline of the M columns of radiating elements, and an $n^{th}$ feeding network is connected to radiating elements in an $n^{th}$ column and the radiating elements in an $n^{th}$ column behind the midline, where $n \in N$, and $n \leq N/2$. Further, for example, radiating elements in a first column are connected to radiating elements in a first column behind the midline through a first feeding network. Radiating elements in a second column are connected to radiating elements in a second column behind the midline through a second feeding network. In response to a quantity of columns of the radiating elements in the array antenna being greater than four, the rest is done in the same manner.

In some other embodiments, the two outputs of an $n^{th}$ feeding network are not necessarily connected to two columns of radiating elements according to the foregoing rule. Alternatively, a possible manner is that the two outputs are connected to any two columns of radiating elements, or the two outputs are located on both sides of the midline. The two outputs are connected to any two columns of radiating elements located on both sides of the midline. In response to the two columns of radiating elements being connected according to the foregoing rule, beam forming is more convenient to control. A specific reason is further described in the following description of an equivalent circuit of a phase shifter.

As shown in FIG. 3B, one of the two outputs of the feeding network includes the phase shifter. The phase shifter enables the two outputs to have a phase difference. In this embodiment, the phase shifters are all provided on the outputs of the feeding network corresponding to the radiating elements in the $(n+M/2)^{th}$ column, to facilitate beam forming control. A reason for disposing the phase shifter is: A distance between a first column of radiating elements and a first column of radiating elements behind the midline is far greater than one wavelength. In response to the distance being greater than one wavelength, beam forming is difficult (generally, beam forming is easy only in response to the distance being less than half a wavelength). As a result, for a beam of each column of radiating elements corresponding to an amplitude and phase design of the feeding network, completely covering one sector of three cellular sectors on a horizontal plane regarding a cover ability of the beam is difficult. Thus, a phase shifter is provided on one of the outputs to generate different phases, so that beam phases of each column of units are different. This increases beam coverage. A speed of the phase shifter is switching at a transmission time interval (Transmission Time Interval, TTI) level, that is, switching is implemented in a slot. The phase shifter enables beams to change in different slots, that is, different beams are formed in different slots. This increases overall coverage.

Figure 4:
FIG. 4 is a schematic diagram of beam spatial coverage of different slots in response to a phase shifter being in a non-X-degree phase state according to at least one embodiment.

In addition, no spatial distribution of users is limited due to a large quantity of downlink slots, and a plurality of beams is used in a plurality of slots to ensure full coverage of users. However, in the uplink, a quantity of slots is limited (in order to use resources properly, downlink resources are usually asymmetrically set to be greater than uplink resources; therefore, allocation of uplink slots is limited; for example, a ratio of downlink slots to uplink slots is usually 8:2 or 4:1), which results in that the slots cannot be used for beam coverage. A schematic diagram of this problem is shown in FIG. 4. FIG. 4 indicates that only a beam in the left figure or the right figure in FIG. 4 is formed by using each uplink slot due to the limited quantity of slots. For example, FIG. 4 is understood as that two slots are configured for an uplink slot. The left figure and the right figure in FIG. 4 indicate the beam coverage of a first slot and a second slot of the two slots respectively. The overall beam coverage of the two slots (that is, the coverage of the superimposed beams of the two slots) is limited, and some users fail to access a network at a same moment (the moment refers to total time formed by the uplink and downlink slots).

Figure 5:
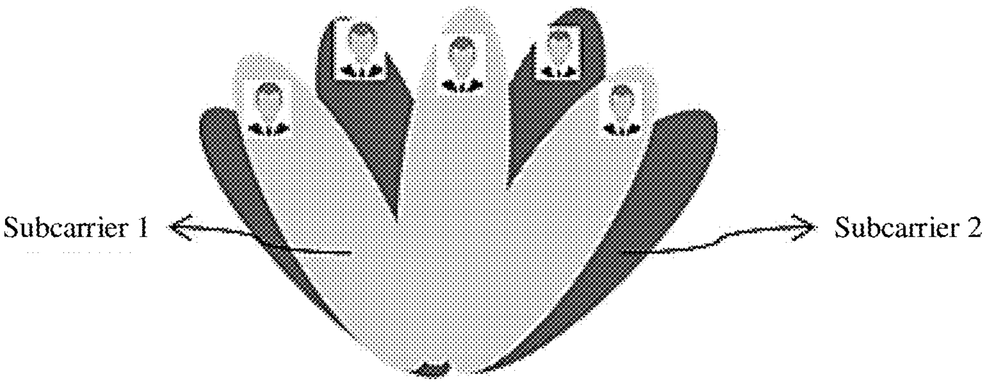
FIG. 5 is a schematic diagram of beam spatial coverage of two subcarriers with different phases in a same slot in response to a phase shifter being in an X-degree phase state according to at least one embodiment.

Based on the problem shown in FIG. 4, the phase shifter in at least one embodiment further enables the phase difference between the two outputs of the feeding network to include at least two states, and one of the states is referred to as an X-degree phase state corresponding to the phase shifter in at least one embodiment, that is, a first operating state. In this state, the phase difference of each subcarrier of the two outputs varies with the frequency of the frequency bands in which each subcarrier is located, that is, the phase difference is in a changing state. In this way, in the uplink slot, in response to the phase shifter being in the X-degree phase state, as shown in FIG. 5, in the same slot, phase differences of subcarriers of the two outputs are different in different frequency bands. Therefore, beams formed by the two outputs have different directions in different frequency bands, which form beams with complementary spatial coverage. In other words, in a same slot, beams in different directions formed in different frequency bands are used for coverage, so that an uplink spatial coverage problem is resolved. Further, in another slot, beam forming is also performed in the foregoing manner, so that spatial coverage in different slots is denser.

Figure 6A:
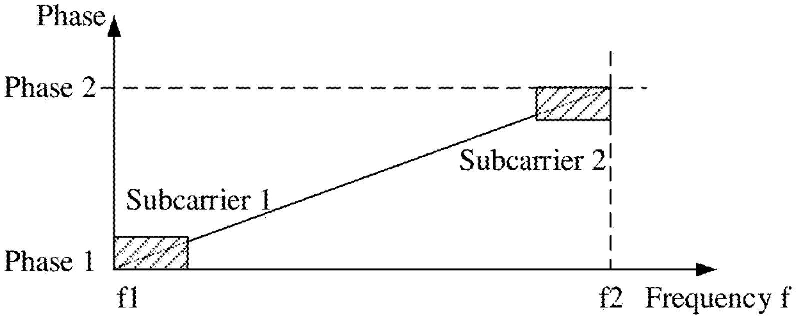
FIG. 6A is a first schematic diagram in which a phase of a subcarrier of each frequency band varies with a frequency in response to a phase shifter being in an X-degree phase state according to at least one embodiment.
Figure 6B:
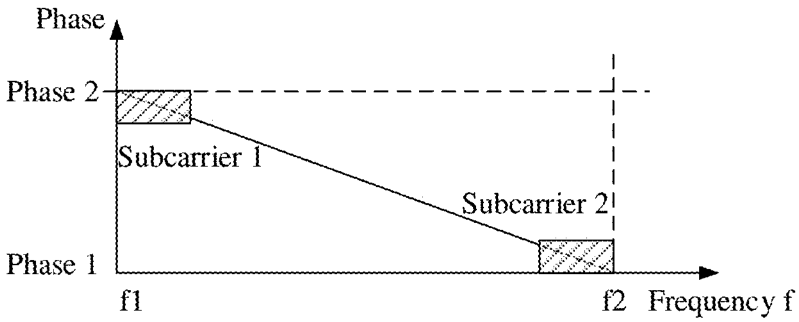
FIG. 6B is a second schematic diagram in which a phase of a subcarrier of each frequency band varies with a frequency in response to a phase shifter being in an X-degree phase state according to at least one embodiment.
Figure 6C:
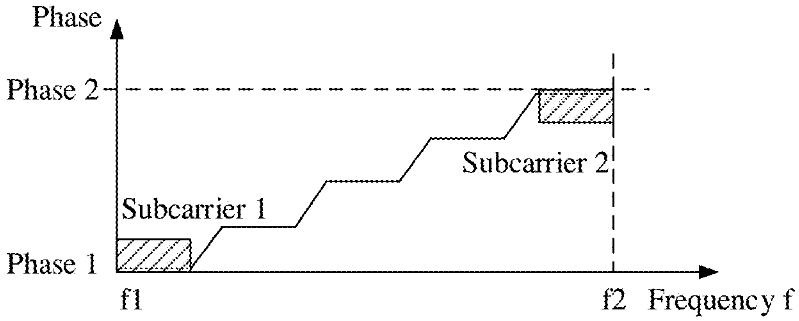
FIG. 6C is a third schematic diagram in which a phase of a subcarrier of each frequency band varies with a frequency in response to a phase shifter being in an X-degree phase state according to at least one embodiment.
Figure 6D:
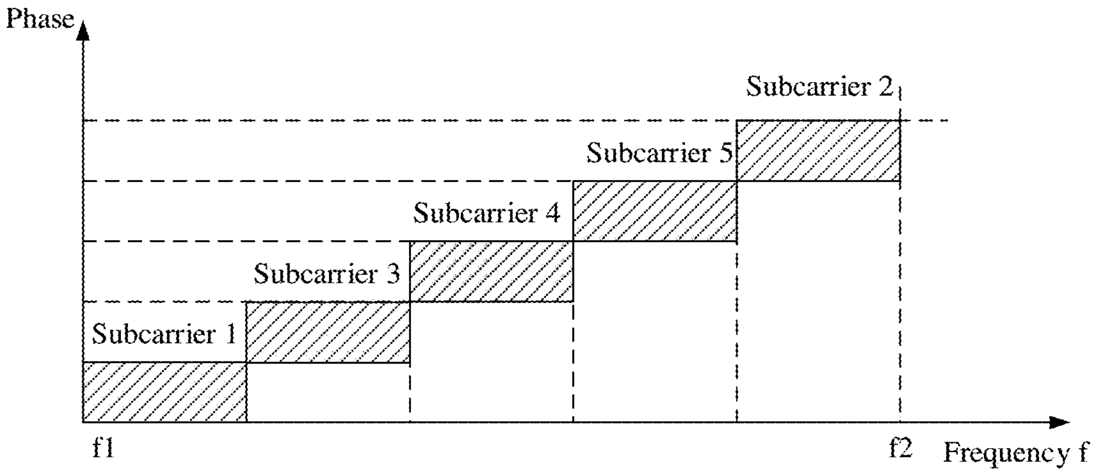
FIG. 6D is a detailed schematic diagram corresponding to FIG. 6A according to at least one embodiment.

The foregoing process is also described with reference to FIG. 6D. In response to the phase shifter being in an X-degree phase state, in a same slot, one channel having the phase shifter outputs a plurality of subcarriers with different phases, and the different subcarriers correspond to different frequency bands. That is, each subcarrier corresponding to the two outputs in each frequency band has a different phase difference, so that each beam formed by the two outputs in each frequency band has a different direction, and these beams of each frequency band form an overall beam in the slot, so that spatial coverage of the beams is denser.

In some embodiments, a curve of a change rate of the phase difference of the two outputs of the feeding network with the frequency is along a straight line whose slope is not 0 or an approximate straight line. In this embodiment, an absolute value of the change rate (the corresponding straight line is the slope) is greater than 0. Optionally, the absolute value is not less than 0.5, and preferably greater than 0.8. FIG. 6A, FIG. 6B, and FIG. 6C are schematic diagrams in which a phase of a subcarrier in each frequency band changes with a frequency in response to a phase shifter being in an X-degree phase state. Since the phase of the output of the other of the two outputs does not change, reference is also made to FIG. 6A to FIG. 6C for a change of a subcarrier phase difference of each frequency band of the two outputs.

FIG. 6A and FIG. 6B respectively show two cases in which K is a positive slope and a negative slope, and FIG. 6C shows a curve similar to that in FIG. 6A. The X-degree phase state corresponds to a curve that changes with the frequency. From a frequency f1 to a frequency f2, a phase of each subcarrier of one output having a phase shifter gradually increases, and a phase difference value of two corresponding outputs gradually increases from 0 degrees to 180 degrees. FIG. 6A, FIG. 6B, and FIG. 6C schematically show only two subcarriers at two ends of the operating frequency band. For other subcarriers between the two subcarriers that change a phase with a frequency change, refer to a schematic diagram shown in FIG. 6D. In FIG. 6A and FIG. 6B, a slope K related to a phase and a frequency is defined, where K=(phase 2−phase 1)/(frequency 2−frequency 1), and the unit of the former is deg, and the unit of the latter is MHz; and the absolute value |K| of the slope K is defined, that is, the value of K is positive. The value of K should be such that a subcarrier phase of a frequency band is apparently different from a subcarrier phase of the original frequency band in response to a corresponding antenna radiating another frequency band. Thus, beam forming of subcarriers in different frequency bands is complementary in space. In at least one embodiment, |K|>0.5, that is, a phase difference in a 90 M sub-range (frequency difference) is to be greater than 45 degrees (phase difference). In this case, corresponding beam forming is complementary in space.

In addition, the subcarrier phase of each frequency band shown in FIG. 6A to FIG. 6D varies with the frequency of each frequency band. In addition, FIG. 6A and FIG. 6C respectively show two cases in which a phase has a changeable state (a curve slope is not 0 in the figure) and an unchanged state (a phase difference of two corresponding outputs is unchanged) in a subcarrier of a single frequency band therein. Alternatively, the phase is changeable in the subcarrier of a part of the single frequency band, and the phase in the other part of the single frequency band is unchanged. In addition, the two parts is arbitrarily crossed and combined.

Figure 7:
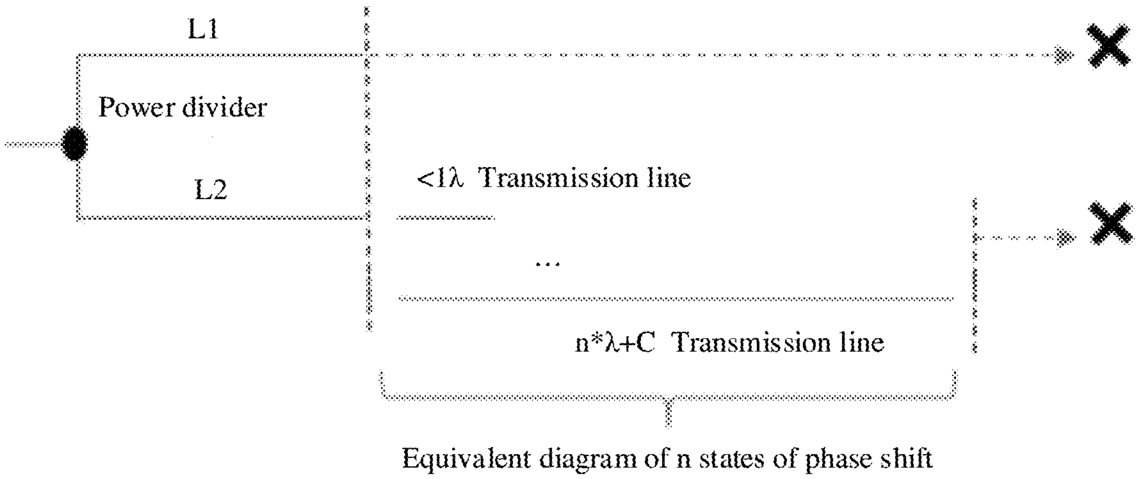
FIG. 7 is a schematic diagram of an equivalent circuit of a feeding network according to at least one embodiment.

For a better understanding of the X-degree phase, refer to FIG. 7 for further detailed explanation. FIG. 7 is a schematic diagram of an equivalent circuit of a feeding network. After the power divider is divided into two outputs, L1 and L2, where the lengths of transmission lines of L1 and L2 are almost the same. The L2 passes through a phase shifter, and the phase shifter includes at least two states, where an equivalent transmission line length of one of the states is less than one wavelength (in this case, the phase shifter is in a 0-degree, 90-degree, or 180-degree phase state), and the equivalent transmission line length of another state (in this case, the phase shifter is in an X-degree phase state) is greater than one wavelength. The transmission line with the length greater than one wavelength implements a function that a phase difference between the L1 and the L2 after being divided by the power divider varies with a frequency. In addition, in response to each feeding network being connected to each column of radiating elements according to the foregoing rule, one output equivalent circuit that is of each feeding network and has a phase shifter is the same. Therefore, each feeding network uses a same control method to control each beam forming, which facilitates beam forming control.

Figure 6E:
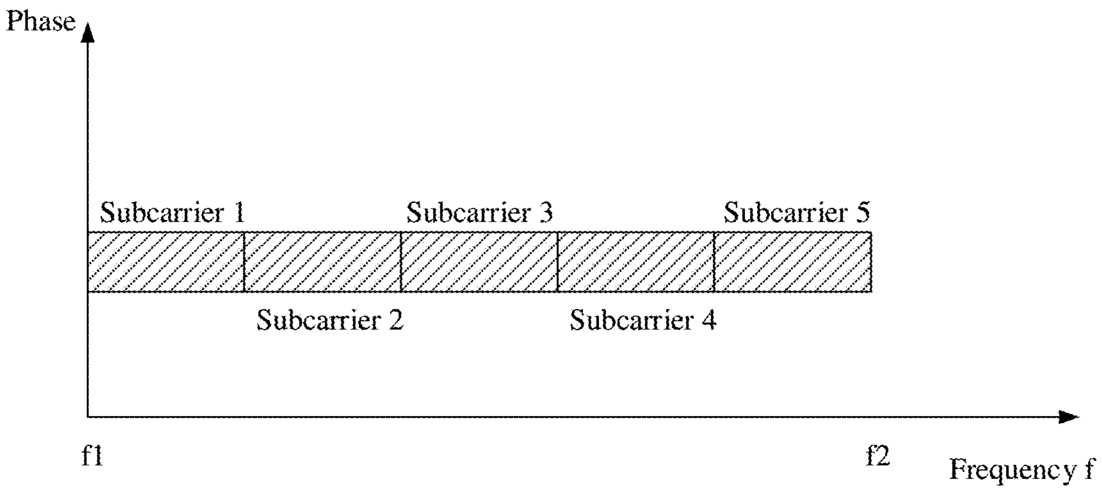
FIG. 6E is a schematic diagram of subcarriers of all frequency bands with a same phase in response to a phase shifter being in a non-X-degree phase state according to at least one embodiment.
Figure 9B:
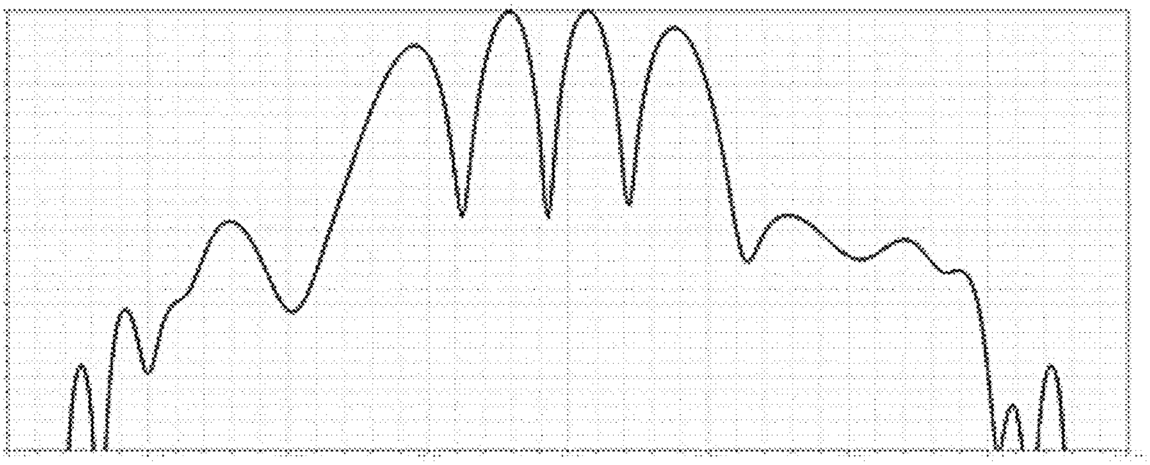
FIG. 9B is a beam forming diagram in a horizontal plane direction in response to a phase shifter enabling two outputs of a feeding network to be 90-degree phase difference according to at least one embodiment.
Figure 9C:
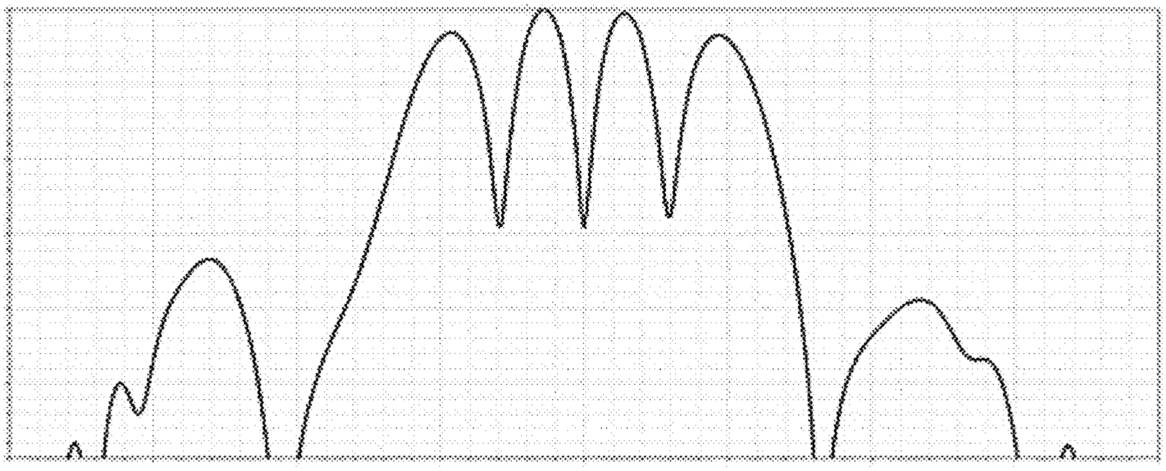
FIG. 9C is a beam forming diagram in a horizontal plane direction in response to a phase shifter enabling two outputs of a feeding network to be 180-degree phase difference according to at least one embodiment.

The phase shifter enables another state of the phase difference of the two outputs of the feeding network to be a specified state of the phase difference. The phase shifter is in a non-X-degree phase state or in a second operating state. The specified phase state is 0 degrees, 90 degrees, or 180 degrees. In this state, the phase shifter performs phase switching of 0 degrees, 90 degrees, or 180 degrees in different slots, to implement different beams in different slots (as shown in FIG. 9A, FIG. 9B and FIG. 9C). However, in the same slot, as shown in FIG. 6E, phases of a plurality of subcarriers, which are output by one output having the phase shifter, corresponding to a plurality of frequency bands in an operating frequency band are the same. That is, a subcarrier phase difference of the two outputs in each frequency band is a fixed value (for example, all 0 degrees, or all 90 degrees, or all 180 degrees), which does not vary with the frequency.

As described above, two outputs of one of the feeding networks are used to be connected to two columns of the array antenna through the foregoing antenna structure, so that a quantity of antenna ports is reduced by half. That is, at least one embodiment resolves a problem that a quantity of RRU ports is not increased in response to an antenna aperture being relatively large (that is, a quantity of columns of an array antenna is relatively large), so that the antenna coverage is increased while system costs are not significantly increased. In addition, the X-degree phase state of the phase shifter is also used to increase beam spatial coverage, especially spatial coverage in uplink, thereby improving a rate of user access.

At least one embodiment further provides an antenna system, including a TRX and the foregoing antenna. A port of the TRX is connected to each antenna port. In this embodiment, the TRX is an RRU.

Correspondingly, a base station is further provided in at least one embodiment, the base station including: a pole, the antenna or the antenna system, where the antenna is fixed on the pole.

The following provides a specific implementation of the antenna. As shown in FIG. 8A, in this specific implementation, a quantity of antenna ports is eight, to match an 8T8R RRU. In this implementation, the array antenna is an 8*10 dual-polarized radiating element, that is, the array antenna has eight columns of dual-polarized radiating elements. In addition, each column has 10 dual-polarized radiating elements, and each column of dual-polarized radiating elements corresponds to two antenna ports of the antenna. In a single-column vertical dimension of the array antenna, every two radiating elements form one group, to form eight horizontal groups; five vertical groups are divided; and the whole array antenna has 40 groups in total. The five groups of antennas in a vertical column is used to form horizontal beam forming through corresponding vertical-dimensional feeding networks.

Figure 8B:
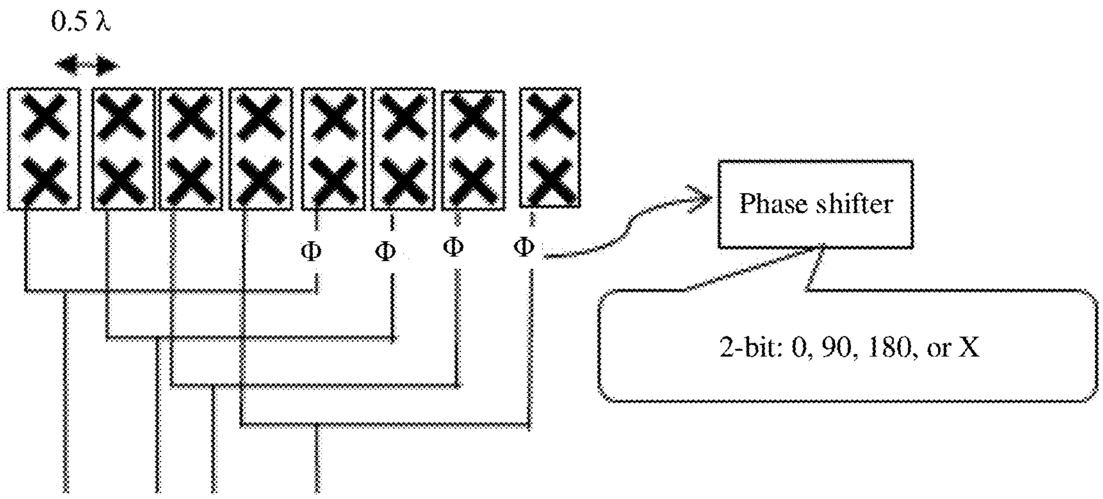
FIG. 8B is a schematic diagram of a connection between a feeding network and an antenna array according to at least one embodiment.

As shown in FIG. 8B, a connection mode of each feeding network is specifically as follows: a first row in a horizontal dimension has eight horizontal groups, where the first group is paired with a fifth group, a second group is paired with the sixth group, a third group is paired with the seventh group, and a fourth group is paired with the eighth group. The pairing refers to being connected to a same power divider.

A phase shifter is arranged on one output of a group of connected feeding networks in each pairing group. The phase shifter is a 2-bit phase shifter, so that the phase shifter has four phase states, which are 0-degree, 90-degree, 180-degree, and X-degree phase states in this implementation. The feeding network is provided with the output of the phase shifter. Compared with the output that is not provided with the phase shifter, the degree of phase lead or lag lies in 0 degrees, 90 degrees, 180 degrees, or X degrees.

The following uses a pairing group of a first column and a fifth column in this implementation as an example to describe a beam forming situation:

FIG. 9A, FIG. 9B, and FIG. 9C respectively correspond to beam forming diagrams in a horizontal plane direction in response to the phase shifter being switched to enable the radiating element groups in a first column and a fifth column to form 0-degree, 90-degree, and 180-degree phases, where a horizontal coordinate in the figures is a frequency; and the vertical coordinate is an amplitude value. For ease of description, in response to the phase shifter being in a non-X-degree phase state, that is, in response to the phase shifter being in a specified value, the phase shifter is referred to as a second operating state.

The forming of the beam forming diagram in the horizontal plane direction is described by using 0 degrees formed by the radiating element group of a first column and a fifth column. As shown in FIG. 8A, each column is vertically divided into five groups, and five groups of radiating elements in a first column and five groups of radiating elements in a fifth column form the beam forming diagram in the horizontal plane direction in response to a phase difference between a first column and a fifth column being 0 degrees. At the moment, the phase shifter is set to operate in a second operating state, so that the phase difference between a first column of the antenna and a fifth column of the antenna is a 0-degree phase difference. In response to the radiating elements in a first column and the radiating elements in the fifth column being switched into a 90-degree phase difference in a next slot, the beam forming diagram is changed as shown in FIG. 9B. Coverage of a plurality of beams in a plurality of slots is implemented in response to the phase shifter operating in a second operating state.

Figure 9D:
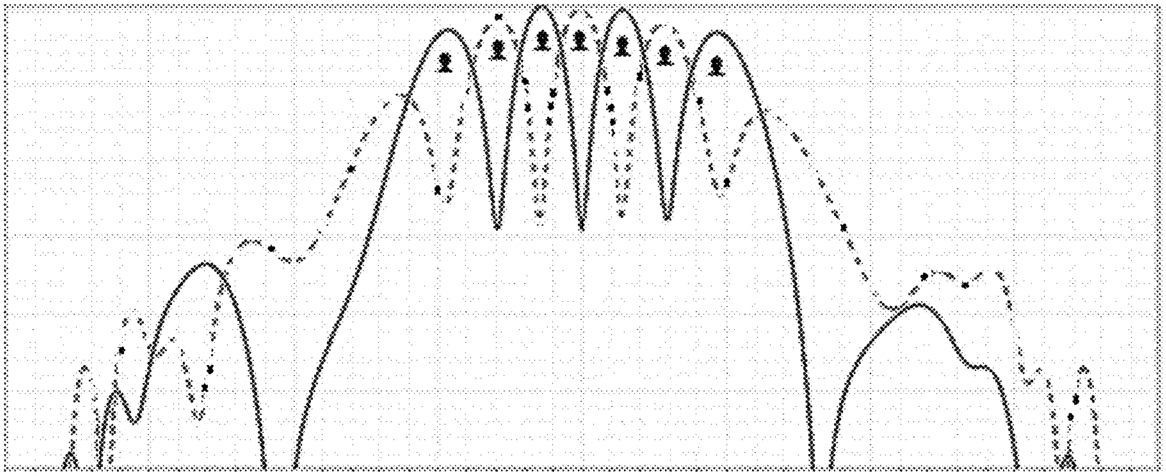
FIG. 9D is a beam forming diagram in a horizontal plane direction in response to a phase shifter enabling two outputs of a feeding network to form two subcarriers with different phases in response to a phase difference being X degrees according to at least one embodiment.

Corresponding to FIG. 9D, in response to the phase shifter switching to the X-degree phase state, in a slot, phase differences of subcarriers in different frequency bands in the operating frequency band is different and varies with frequency bands in response to a first column and a fifth column of radiating elements forming waveforms. Subcarriers with different phase differences form beams which have different directions in each frequency band, and then beams in all frequency bands form an overall beam in the slot. Herein, an example of FIG. 9D happens to be: In one slot, five groups of radiating elements in a first column and five groups of radiating elements in a fifth column radiate a waveform of a first frequency band; and the phase shifter is used to enable a subcarrier phase of the first frequency band to be 0 degrees, to form a beam forming diagram in a horizontal plane direction shown in FIG. 9A. At the same time, the five groups of radiating elements in a first column and the five groups of radiating elements in a fifth column radiate a waveform of a second frequency band; and the phase shifter is used to enable the subcarrier phase of a second frequency band to be 180 degrees, to form a beam forming diagram in a horizontal plane direction shown in FIG. 9C. Therefore, a beam forming diagram formed by two frequency bands in a slot is shown in FIG. 9D, and is a superimposed diagram of the beam forming diagrams in FIG. 9A and FIG. 9C.

From FIG. 9D, different beams which are spatially complementary in the slot is generated by subcarriers with different phase differences corresponding to different frequency bands in the same slot in response to the phase shifter switching to the X-degree phase state. This increases the coverage space of the beam forming. In this way, in the case of uplink access of the user mentioned above, the beam coverage space in each slot is increased. Thus, the overall beam coverage space (namely, superposition of beam coverage of each uplink slot) is further increased, and simultaneous access is met in the case of user limit distribution.

Figure 10:
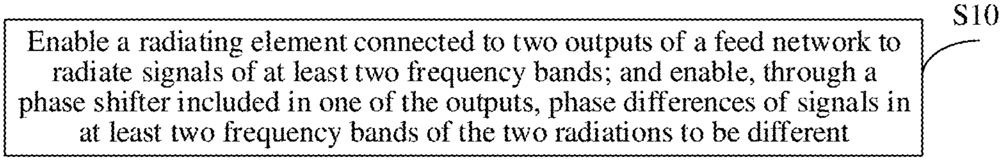
FIG. 10 is a flowchart of a beam forming method according to at least one embodiment.

Correspondingly, a beam forming method based on the foregoing antenna is provided in at least one embodiment. As shown in FIG. 10, the method includes the following step:

S10: Enable the radiating element connected to two outputs of a feeding network to radiate signals of at least two frequency bands; and enable phase differences of signals in at least two frequency bands of the two radiations to be different through the phase shifter included in one of the outputs, where the phase shifter is in the X-degree phase state, namely, the phase shifter is in a first operating state.

In the several embodiments described herein, the disclosed system, apparatus, and method is able to be implemented in another manner. For example, the described apparatus embodiment is merely an example. For example, division into the units is merely logical function division and is other division during actual implementation. For example, a plurality of units or components is combined or integrated into another system, or some features is ignored or not performed. In addition, the displayed or discussed mutual connection or direct connection or communication connection is through some interfaces, and the indirect connection or communication connection of the apparatus or unit is in an electrical, mechanical, or other form.

The units described as separate parts may or may not be physically separate, and parts displayed as units may or may not be physical units, is located in one position, or is distributed on a plurality of network units. Some or all of the units is selected based on actual usage to achieve the objectives of the solutions of embodiments.

In addition, functional units in at least one embodiment is integrated into one processing unit, each of the units exist alone physically, or at least two units are integrated into one unit.

The foregoing are merely example embodiments and applied technical principles of at least one embodiment. A person skilled in the art understands that embodiments described herein are not limited to the specific embodiments described herein, and a person skilled in the art is able to make various obvious changes, adjustments, and replacements without departing from the protection scope of at least one embodiment. Therefore, although embodiments described in detail by using the foregoing embodiments, embodiments described herein are not limited to the foregoing embodiments, and further includes more equivalent embodiments without departing from the concept of at least one embodiment. All of the embodiments fall within the protection scope of at least one embodiment.

What is claimed is:

1. A feeding network, comprising:

one input and two outputs, wherein one of the two outputs includes a phase shifter; and the phase shifter includes a first operating state, wherein the first operating state includes in phase differences of two output signals, wherein the phase differences of the two output signals includes the two output signals in at least two frequency bands that are different.

2. The feeding network according to claim 1, wherein the phase differences of the two output signals in the at least two frequency bands are different includes: the phase differences of the two output signals in the frequency bands vary with frequencies of the frequency bands.

3. The feeding network according to claim 2, wherein a change rate of the phase difference varying with a frequency of each frequency band is not less than 0.5.

4. The feeding network according to claim 2, wherein the phase shifter further includes a second operating state, wherein the second operating state enables the two outputs to have a specified phase difference.

5. The feeding network according to claim 4, wherein the specified phase difference includes: 0 degrees, 90 degrees, or 180 degrees.

6. The feeding network according to claim 1, wherein the phase differences of the two output signals in at least one of the frequency bands remains unchanged.

7. An antenna, comprising:

an array antenna;

an antenna port; and at least one feeding network, wherein the at least one feeding network includes one input and two outputs, and one of the two outputs includes a phase shifter; wherein the phase shifter includes a first operating state, where the first operating state includes phase differences of two output signals at the two outputs, wherein the phase differences of the two output signals in the at least two frequency bands are different;

wherein the array antenna includes a plurality of radiating elements;

wherein each output of each of the at least one feeding network is connected to at least one radiating element in the array antenna; and each input of each of the at least one feeding network is connected to the antenna port.

8. The antenna according to claim 7, wherein the plurality of the radiating elements of the array antenna form at least M columns of the plurality of the radiating elements, and M outputs of N of the at least one feeding networks are respectively connected to the M columns of the plurality of radiating elements, wherein M=2N, and N>1.

9. The antenna according to claim 8, wherein two outputs of an nth of the at least one feeding network are respectively connected to an nth of the plurality of the radiating elements and an (n+M/2)th column of the plurality of the radiating elements in the M columns of the plurality of the radiating elements, and one output connected to an (n+M/2)th column of the plurality of the radiating elements includes the phase shifter, wherein n∈N, and n≤N/2.

10. The antenna according to claim 7, wherein the phase differences of the two output signals in at least two frequency bands are different incudes the phase differences of the two output signals in the frequency bands vary with frequencies of the frequency bands.

11. The antenna according to claim 7, wherein a change rate of the phase difference varying with a frequency of each of the frequency bands is not less than 0.5.

12. The antenna according to claim 7, wherein the phase shifter further includes a second operating state, wherein the second operating state enables the two outputs signals to have a specified phase difference.

13. The antenna according to claim 7, wherein the specified phase difference includes 0 degrees, 90 degrees, or 180 degrees.

14. The antenna according to claim 7, wherein the phase differences of the two output signals in at least one of the frequency bands remains unchanged.

15. An antenna system, comprising:

a transceiver; and an antenna, wherein the antenna includes an array antenna, antenna ports, and at least one feeding network;

each port of the transceiver is correspondingly connected to each of the antenna ports;

wherein the feeding network includes one input and two outputs, and one of the two outputs includes a phase shifter; wherein the phase shifter includes a first operating state, wherein the first operating state includes phase differences of two output signals, wherein the phase differences of the two output signals in at least two frequency bands are different;

the array antenna includes a plurality of radiating elements;

each of the two outputs of the feeding network is connected to at least one of the plurality of radiating element in the array antenna; and the input of the feeding network is connected to each of the antenna ports.

16. The antenna system according to claim 15, wherein that phase differences of the two output signals in the at least two frequency bands are different, wherein the phase differences of the two output signals in the frequency bands vary with frequencies of the frequency bands.

17. The antenna system according to claim 15, wherein a change rate of the phase difference varying with a frequency of each frequency band is not less than 0.5.

18. The antenna system according to claim 15, wherein the phase shifter further includes a second operating state, wherein the second operating state enables the two outputs to have a specified phase difference.

19. The antenna system according to claim 15, wherein the specified phase difference includes 0 degrees, 90 degrees, or 180 degrees.

20. The antenna system according to claim 15, wherein the phase differences of the two output signals in at least one of the frequency bands remains unchanged.

* * * * *